(12) United States Patent
Phipps (10) Patent No.: US 9,394,963 B2
(45) Date of Patent: *Jul. 19, 2016

(54) MOTORCYCLE FORK RESTRAINT DEVICE

(71) Applicant: Works Connection, Inc., Diamond Springs, CA (US)

(72) Inventor: Eric Phipps, Placerville, CA (US)

(73) Assignee: Works Connection, Inc., Diamond Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,465

(22) Filed: May 16, 2014

(65) Prior Publication Data

US 2014/0360827 A1 Dec. 11, 2014

Related U.S. Application Data

(63) Continuation of application No. 13/475,264, filed on May 18, 2012, now Pat. No. 8,727,081.

(60) Provisional application No. 61/488,681, filed on May 20, 2011.

(51) Int. Cl.
| | |
|---|---|
| *F16F 9/56* | (2006.01) |
| *B62K 25/00* | (2006.01) |
| *B62K 25/08* | (2006.01) |
| *B62K 25/04* | (2006.01) |

(52) U.S. Cl.
CPC . *F16F 9/56* (2013.01); *B62K 25/08* (2013.01); *B62K 2025/047* (2013.01)

(58) Field of Classification Search
CPC ......... F16F 9/56; B60N 2/231; B60G 17/005; A47C 3/30; A47C 1/0242

USPC ............... 188/300, 299.1; 280/276, 279; 292/251.5

See application file for complete search history.

(56) References Cited

U.S. PATENT DOCUMENTS

| | | | | |
|---|---|---|---|---|
| 2,868,482 | A | * 1/1959 | Westcott, Jr. | ........... B64C 25/10 244/102 R |
| 4,735,276 | A | 4/1988 | Burton | |

(Continued)

FOREIGN PATENT DOCUMENTS

| | | | |
|---|---|---|---|
| GB | 2188676 | 10/1987 | |
| GB | 2188676 A | * 10/1987 | ............ E05C 19/004 |

OTHER PUBLICATIONS

Works Connection, EZ Holeshot Installation Instructions, Sep. 28, 2009 as downloaded on Aug. 24, 2012. <http://worksconnection.com/images/instructions/19-222_W_TEMPLATE_pdf.pdf>.

*Primary Examiner* — Robert A Siconolfi
*Assistant Examiner* — San Aung
(74) *Attorney, Agent, or Firm* — Knobbe, Martens, Olson & Bear, LLP (57) ABSTRACT

A restraint device for being secured on a telescopic suspension comprising a first portion, which may be a fork band comprising a first restraining hook, a second portion comprising a body, a trigger, at least one magnetic member, and a second restraining hook, wherein the first restraining hook and the second restraining hook are configured to selectively engage one another to secure the suspension in a compressed position, and wherein the at least one magnetic member is configured to retract the second restraining hook when the device is disengaged to permit normal operation of the suspension.

10 Claims, 8 Drawing Sheets

(56) References Cited

U.S. PATENT DOCUMENTS

| | | | |
|---|---|---|---|
| 6,279,932 B1 * | 8/2001 | White | B62D 53/0857 188/265 |
| 6,776,429 B2 * | 8/2004 | Chou | B62K 21/18 280/279 |
| 7,051,852 B2 | 5/2006 | Maret | |
| 8,727,081 B2 | 5/2014 | Phipps | |
| 2006/0237273 A1 * | 10/2006 | Maret | B60G 17/005 188/300 |

* cited by examiner

MOTORCYCLE FORK RESTRAINT DEVICE

RELATED APPLICATIONS

Related applications are identified in an application data sheet (ADS) filed with this application.

INCORPORATION BY REFERENCE

The entireties of all applications listed in the ADS filed herewith are hereby expressly incorporated by reference herein and made a part of the present disclosure.

BACKGROUND OF THE INVENTION

1. Field of the Invention

The present invention relates generally to temporary restraint devices for motorcycle suspension assemblies. In particular, the present invention relates to a restraint device for temporarily restraining a motorcycle front fork assembly in a partially compressed position having an improved construction with a more robust and reliable release mechanism.

2. Description of the Related Art

A variety of restraint devices have been employed to temporarily secure a motorcycle front suspension fork assembly in a partially or fully compressed position for a period of time and then to release the suspension fork and permit normal operation to continue. Typically, the restraint devices are used to hold the suspension fork in a partially compressed position for the start of a motorcycle race to shift the center of gravity of the motorcycle in a forward direction and reduce the tendency of the front wheel of the motorcycle to lift off the ground or reduce the distance that the wheel lifts off the ground. The restraint devices respond to further compression of the suspension fork, usually caused by braking of the motorcycle, to release the suspension fork and move to a retracted position, in which normal operation of the suspension fork is resumed. One example of a temporary suspension restraint device is disclosed in U.S. Pat. No. 7,051,852 to Maret, the entirety of which is incorporated by reference herein.

SUMMARY OF THE INVENTION

Preferred embodiments of the motorcycle fork restraint device provide a robust and reliable design. Preferably, the restraint devices employ one or more magnets that develop a force tending to bias the restraint device toward a released or retracted position. In preferred arrangements, the magnet(s) develop all or substantially all of the biasing force tending to move the restraint device toward the released or retracted position. That is, preferably, other biasing elements, such as the springs often used in restraint devices, are omitted. The applicant has discovered that a magnetic-based retraction or release mechanism provides reliable operation and longevity of the restraint device and allows a motorcycle rider to set the device without assistance.

1. A suspension restraint device including a telescopic suspension having an outer tube, an inner tube, and wherein the outer tube and the inner tube are configured to be movable relative to one another. A first portion of the restraint device is secured to a first location on the suspension. The first portion includes an engagement portion. A second portion of the restraint device is secured to a second location on the suspension. The second portion includes a body and a lever-actuated restraining hook configured to selectively engage the engagement portion of the first portion to secure the suspension in a partially compressed position. At least one magnetic member is configured to retract the restraining hook.
2. The device of paragraph 1, wherein the telescopic suspension further includes a fork guard.
3. The device of paragraph 2, wherein the second portion is secured to the fork guard.
4. The device of paragraph 1, wherein the lever-actuated restraining hook includes a trigger.
5. The device of paragraph 4, wherein the trigger includes a curved surface configured to accommodate the setting of the device by a gloved hand.
6. The device of paragraph 4, wherein the at least one magnetic member includes a first magnetic member coupled to the body of the second portion and a second magnetic member coupled to the trigger. The first and second magnetic members are configured to create a magnetic force tending to retract the restraining hook into the body.
7. The device of paragraph 1, wherein the engagement portion of the first portion includes a second restraining hook configured to engage the lever-actuated restraining hook.
8. The device of paragraph 7, wherein the second restraining hook includes an interference surface configured to engage the lever-actuated restraining hook and a chamfered surface. The lever-actuated restraining hook includes an interference surface configured to engage the second restraining hook and a chamfered surface, thereby allowing the chamfered surface of the lever-actuated restraining hook to glide over the chamfered surface of the second hook as the restraint device is being set.
9. A method of using a suspension restraint device, the method including compressing the suspension, lifting a lever actuated restraining hook against a biasing magnetic force and engaging it with an engagement portion of the suspension, and disengaging the hook from the engagement portion, wherein the hook retracts to provide clearance from the engagement portion.
10. The method of paragraph 9, wherein the disengaging is accomplished by braking or encountering a bump.
11. The method of paragraph 9, wherein the retraction is accomplished through at least one magnetic member.

BRIEF DESCRIPTION OF THE DRAWINGS

Certain features, aspects and advantages of the present suspension restraint devices are described below with reference to drawings of preferred embodiments, which are provided for the purpose of illustration and not limitation. The drawings contain eight (8) figures.

DETAILED DESCRIPTION OF THE PREFERRED EMBODIMENTS

FIGS. 1-7 illustrate a preferred embodiment of a vehicle suspension assembly temporary restraint device 10. In the illustrated arrangement, the restraint device 10 is employed with a front suspension fork assembly 11 of a motorcycle; however, the device 10 could be used or modified for use with other suspension assemblies or in other vehicle applications, as well. The illustrated suspension fork is a so-called "upside down" telescopic suspension fork that includes an upper portion, or upper tube 12, and a lower portion, lower tube or stanchion 14. As is known, the fork could reverse the illustrated arrangement and position the larger, outer tube at the bottom and the smaller, inner tube at the top. The tubes 12, 14 are telescopically engaged with one another to move between an extended position and a compressed position. The suspension fork typically includes a suspension spring and a damper assembly, as is known. The illustrated suspension fork also includes a guard 16 that protects the lower tube 14, such as a forward and/or outside portion of the lower tube 14, and provides a location to mount a portion of the restraint device 10. However, the device 10 can be secured to any suitable location on the suspension fork, or to a specifically-constructed support structure. Preferably, the complete assembly of the restraint device 10 would be lightweight, for example weighing only about 50 grams or less.

Figure 1:
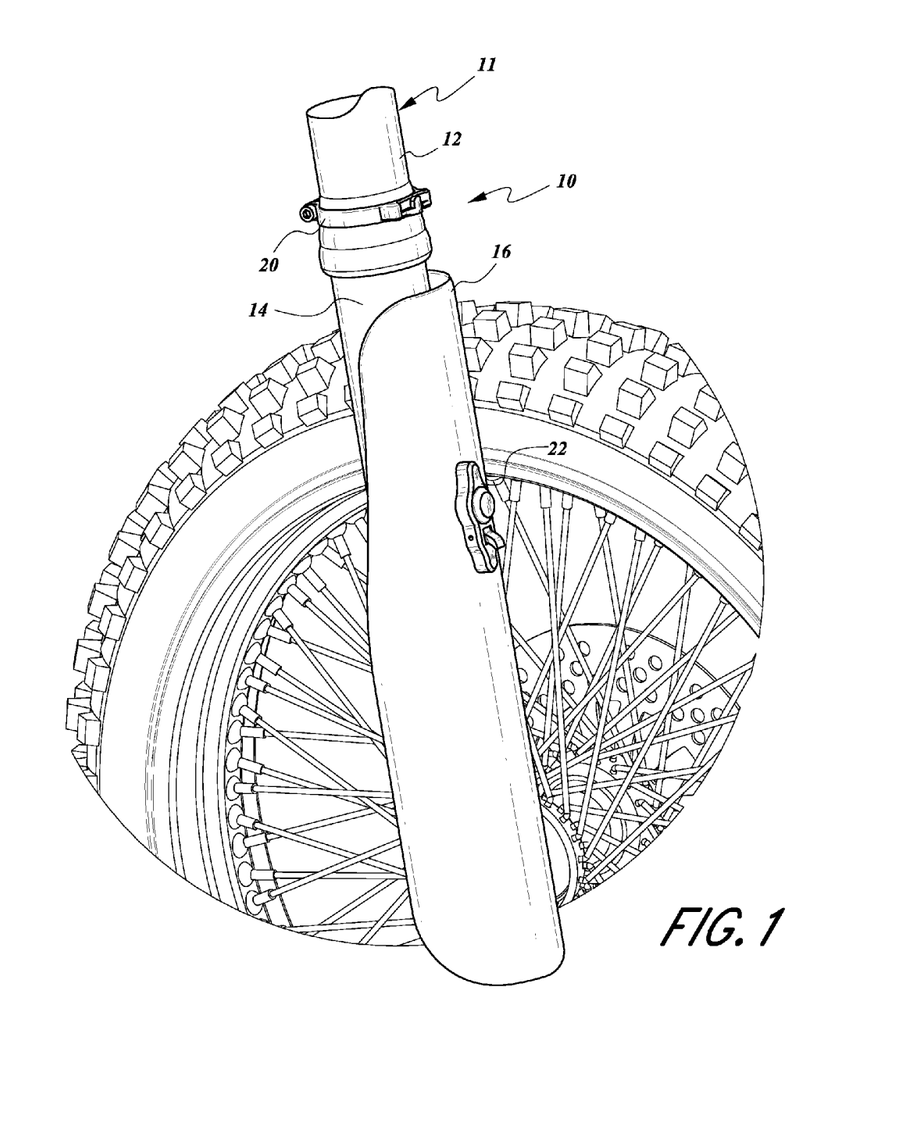
FIG. 1 is a perspective view of a portion of a motorcycle including a front suspension system incorporating a temporary restraint device having certain features, aspects and advantages of the preferred embodiments.
Figure 2:
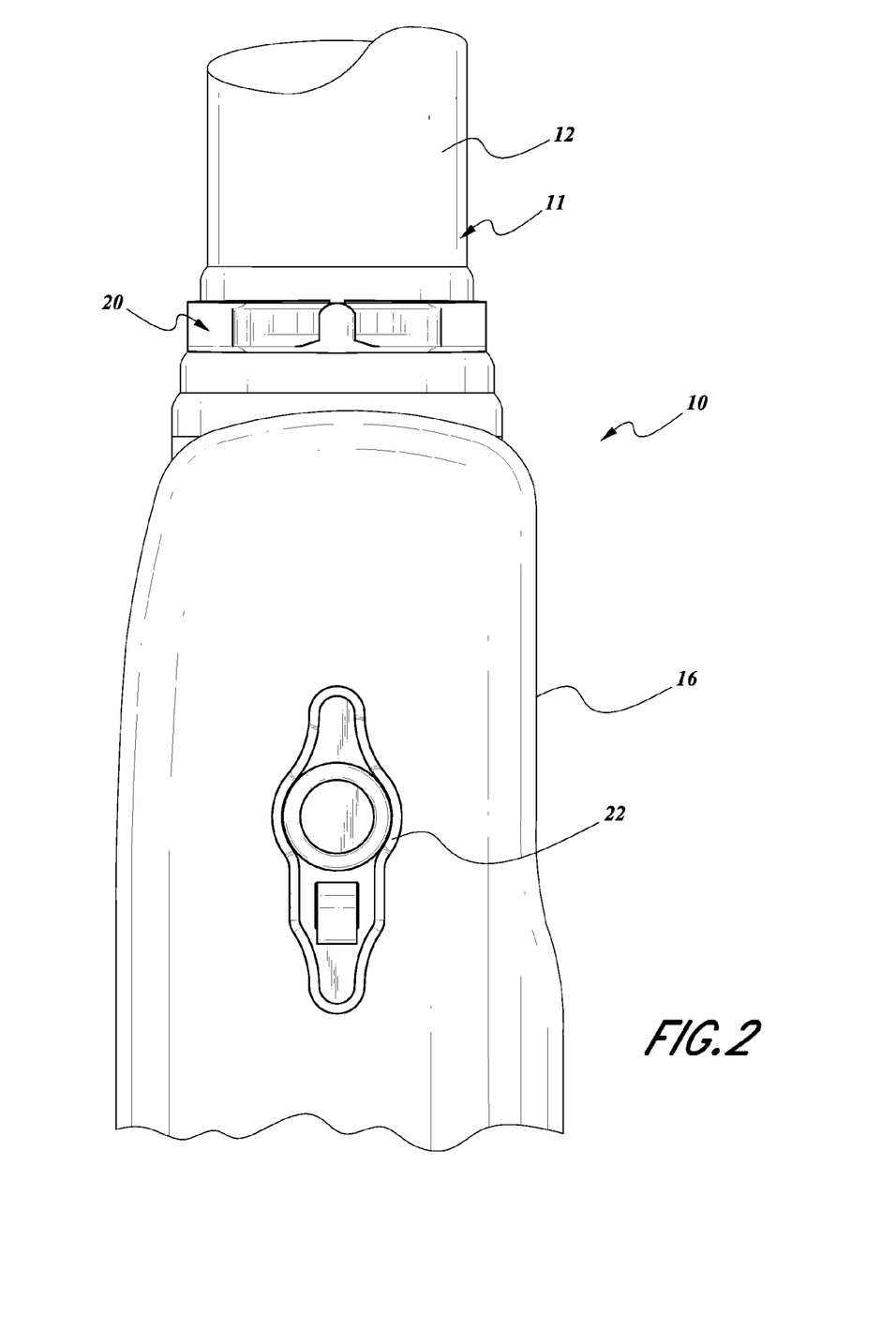
FIG. 2 is a front view of the front suspension system and restraint device of FIG. 1.
Figure 3:
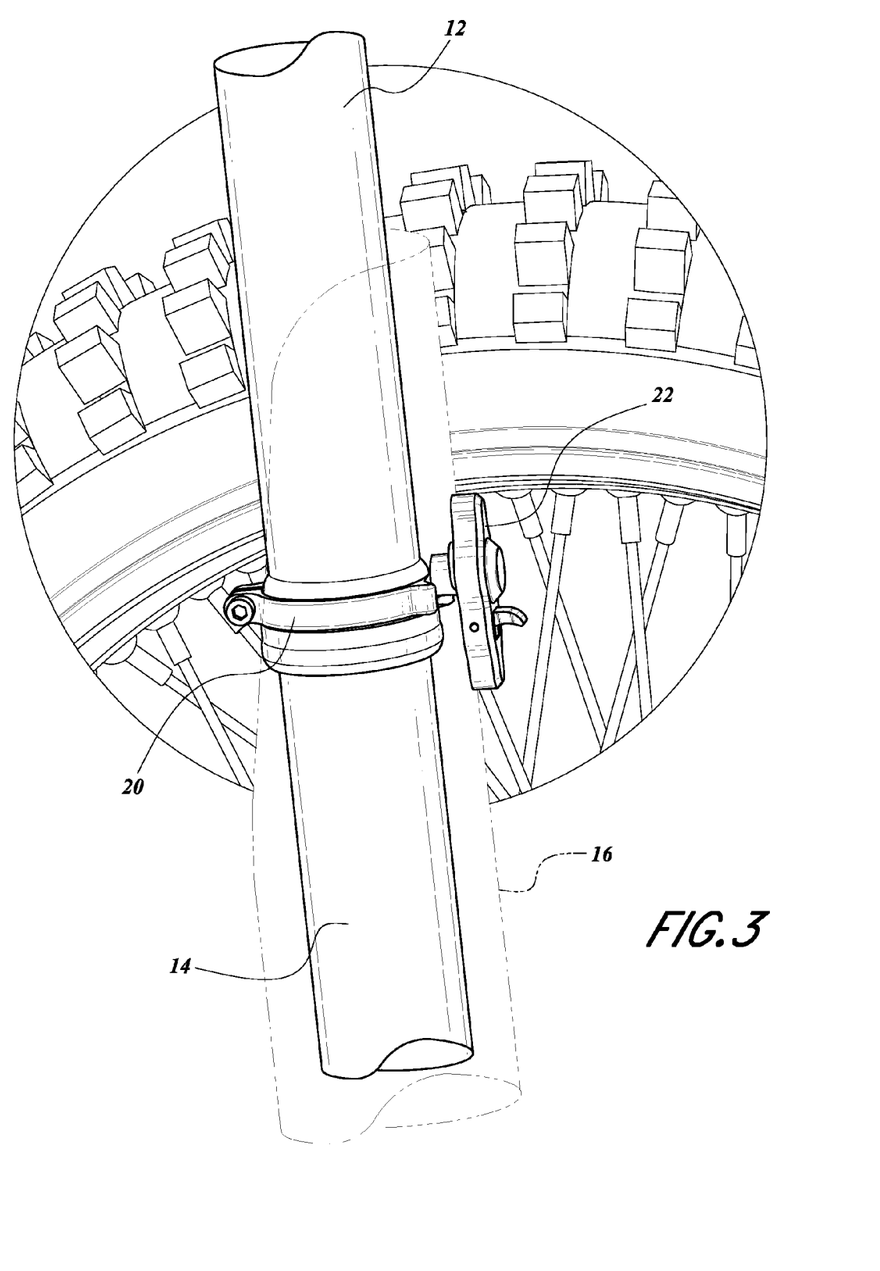
FIG. 3 is a side view of the front suspension system and restraint device of FIG. 1 with the front suspension system in a partially retracted position.
Figure 4:
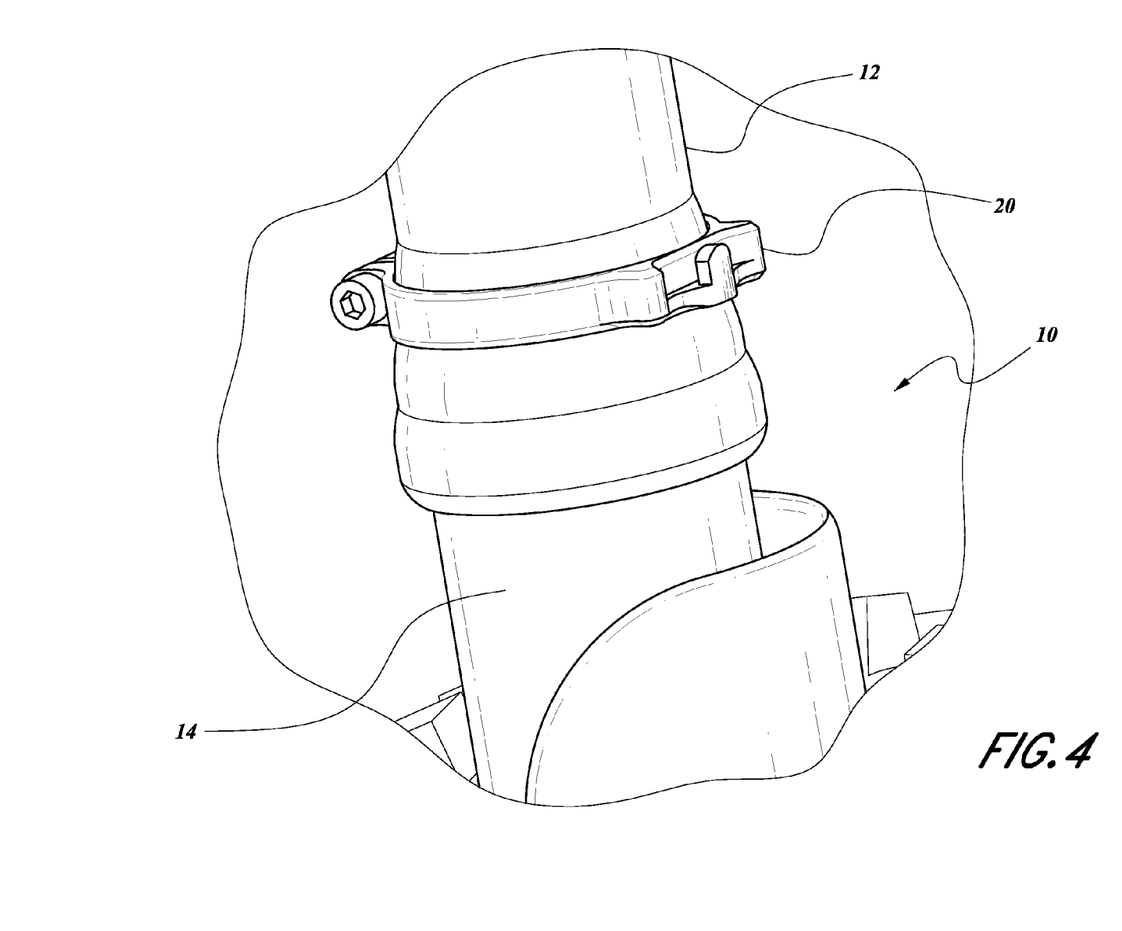
FIG. 4 is a side view of a first portion of the restraint device that is coupled to a first portion of the suspension system.
Figure 5:
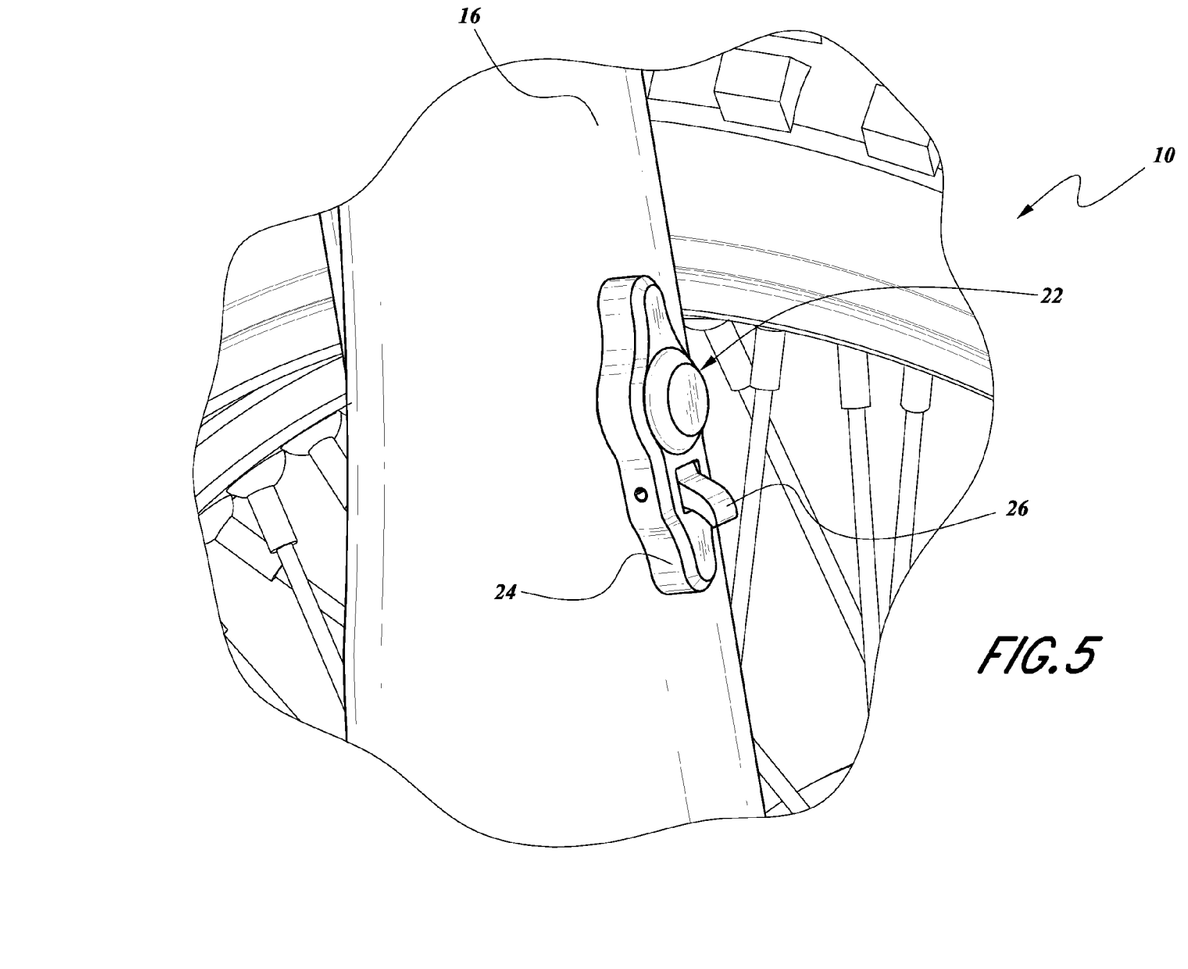
FIG. 5 is a perspective view of a second portion of the restraint device that is coupled to a second portion of the suspension system.

The illustrated restraint device 10 includes a first portion 20, which is referred to as a fork band herein because, in the illustrated arrangement, the first portion 20 is in the form of a band that surrounds the fork. However, the first portion 20 could be secured to the fork in another suitable manner or could be secured to the lower portion 14 of the fork instead. The restraint device 10 also includes a second portion 22, which is referred to as a lever portion herein. The fork band 20 and lever portion 22 are secured to opposite portions of the suspension fork and are configured to selectively engage one another, upon actuation of the restraint device 10, to secure the fork in a partially compressed position. That is, the fork band 20 is coupled to one of the telescopic portions (e.g., the upper tube 12) and the lever portion 22 is coupled to the other of the telescopic portions (e.g., the lower portion 14). In the illustrated arrangement, the fork band 20 is secured to the upper tube 12 and the lever portion 22 is secured to the lower tube 14 and, in particular, to the guard 16. Preferably, a surface of the lever portion 22 which is in contact with the guard 16 may be contoured such that the surface corresponds to the shape of the guard 16, allowing the lever portion 22 to be in contact with the guard 16 throughout its surface area. The fork band 20 and lever portion 22 are located on the respective tubes 12, 14 such that, when engaged, the suspension fork is temporarily secured in a desired partially compressed position. The location of one or both of the fork band 20 and lever portion 22 can be altered to determine the exact partially compressed position. In some preferred arrangements, the location of the lever portion 22 is varied to determine the amount of compression when the restraint device 10 is engaged. In other arrangements, the location of the fork band 20 is varied to determine the amount of compression when the restraint device 10 is engaged. When the suspension fork is further compressed from the partially compressed position, usually due to braking forces or encountering a bump, the restraint device 10 disengages to permit normal operation of the suspension fork.

Figures 6A, 6B:
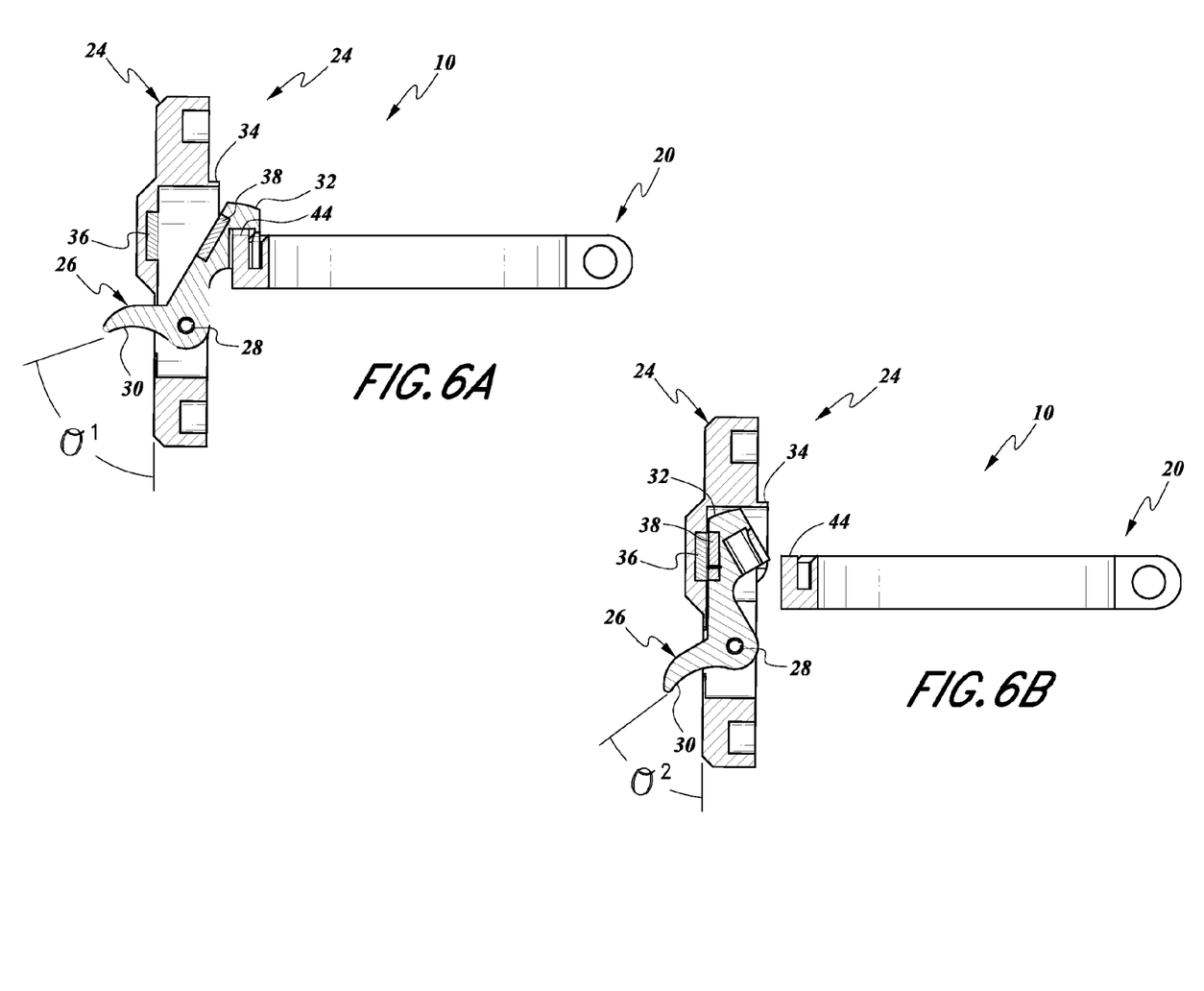
FIGS. 6A and 6B illustrate the restraint device in engaged and disengaged positions, respectively.

With reference to FIGS. 6A-6B, the illustrated lever portion 22 includes a body 24 and a lever-actuated, pivoting restraining hook, which is referred to herein as a trigger 26. The body 24 preferably is elongated in a vertical direction and defines a generally hollow interior space that faces the fork guard 16 when assembled to the suspension fork. The interior space accommodates a substantial portion of the trigger 26. The body 24 also supports a bearing support or pin 28 that rotatably supports the trigger 26. The pin 28 can be a spring pin in some arrangements. The trigger 26 includes an actuation portion 30, or finger grip portion, that protrudes in a forward direction from the body 24 through an opening 31 in the forward wall of the body 24 and is accessible to a user of the device 10. The actuation portion 30 may be curved to facilitate setting the restraint device 10 with a gloved finger. The trigger 26 also includes an engagement portion 32, which is referred to herein as a hook. The hook 32 can be retracted within the interior space of the body 24 in a retracted position, or a released or disengaged position of the restraint device 10 (FIG. 6B). The hook 32 can also be exposed and extend rearwardly of the body 24 in an advanced position, or an engaged or actuated position of the restraint device 10 (FIG. 6A). In the advanced position, the hook 32 extends through a boss 34, which itself extends through an opening present or created in the fork guard 16. Also, in the advanced position, the hook 32 is positioned rearwardly of the fork guard 16 such that it can engage with the fork band 20 to selectively secure the suspension fork in a partially compressed position.

In the advanced position, the actuation portion 30 defines an angle $\Theta_1$ relative to a front face of the body 24 and/or generally with an axis of the leg of the suspension fork. In one arrangement, the angle $\Theta_1$ can be about 90 degrees. In the retracted position, the actuation portion 30 defines an angle $\Theta_2$ relative to a front face of the body 24 and/or generally with an axis of the leg of the suspension fork. In one arrangement, the angle $\Theta_2$ can be about 65 degrees. These angles facilitate operation of the restraint device 10, even with gloved hands, while also being of a sufficient difference to provide a visual indication of the position. During movement between the retracted position and the advanced position and in either position, the shape of the trigger 26 reduces the window for particle entry into the lever portion 22.

The lever portion 22 also includes at least one magnetic member and, preferably, a pair of magnetic members 36, 38. One magnetic member 36 is coupled to the body 24 and the other magnetic member 38 is coupled to the trigger 26. The magnetic members 36, 38 are arranged to attract one another to create a magnetic force tending to move the trigger 26 toward the retracted position. Accordingly, when released from the fork band 20, the trigger 26 is returned to the retracted position to permit continued normal operation of the suspension fork without interference from the restraint device 10. The magnetic members 36, 38 require the trigger 26 to be lifted in order to set the restraint device 10, so that a rock or other debris contacting the vehicle during operation is less likely to accidentally engage the restraint device 10. It has been determined by the applicant that the magnetically-actuated restraint device 10 provides reliable operation even in adverse conditions (e.g., muddy, wet or cold environments). Although the illustrated lever portion 22 includes magnetic members configured to attract one another, it is also possible to arrange the magnetic members to repel one another; however, the location of the members should be modified such that the force generated still tends to move the trigger 26 toward the retracted position. Moreover, although two magnetic members are employed, it is also possible to employ a single magnetic member in cooperation with a magnetically attractive material or member. As used herein, the term "magnetic member" can refer to magnetic elements having opposite poles or to magnetically attractive materials or members. The illustrated magnetic members are circular in shape from an end view and the same or similar in size (e.g., diameter and thickness). However, other shapes and sizes can also be employed and one magnetic member can be sized differently than the other magnetic member.

Figure 7:
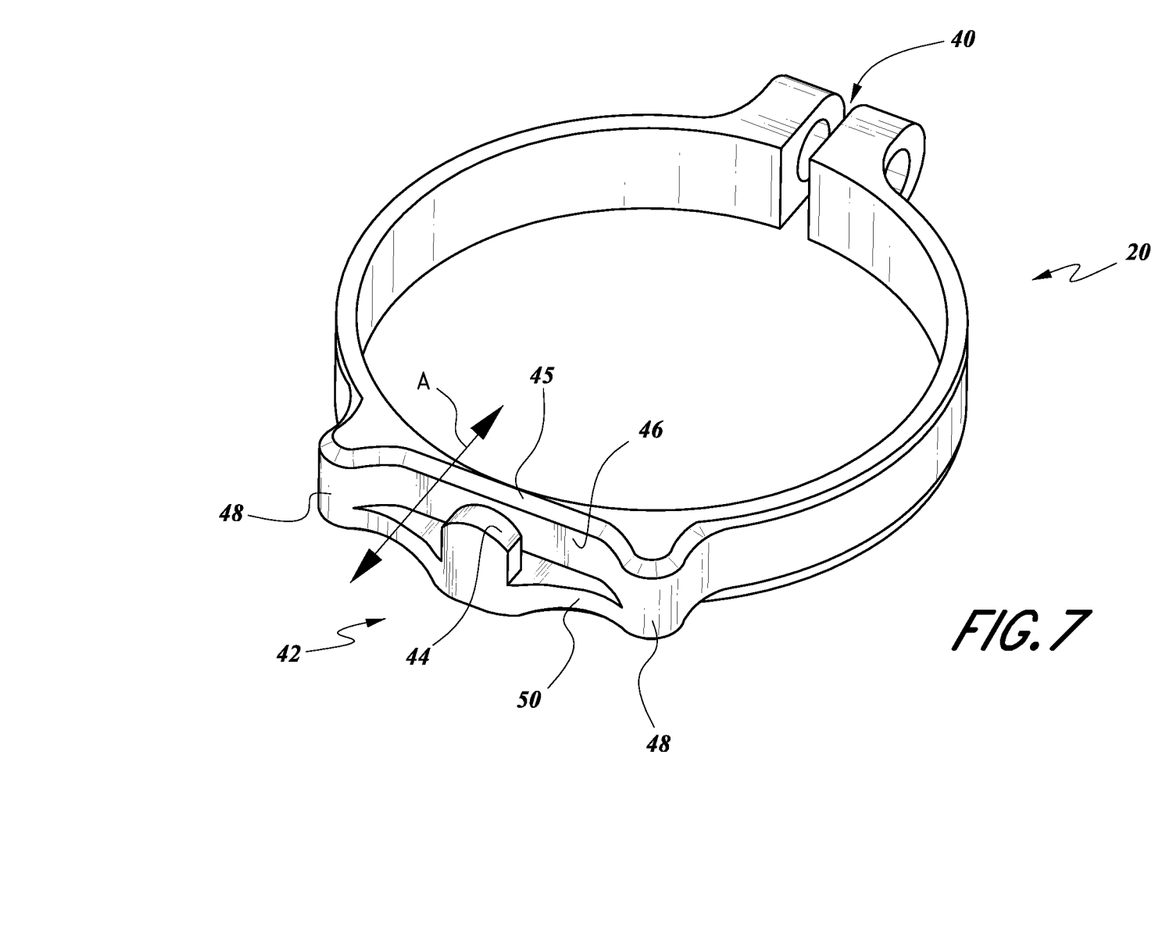
FIG. 7 is a perspective view of one embodiment of the first portion of the restraint device removed from the suspension system.

With reference to FIG. 7, a preferred embodiment of the fork band 20 is illustrated. The fork band 20 is configured to surround a fork leg and includes an assembly slot 40, preferably at or near a rearward portion of the fork band 20. The fork band 20 can include a threaded opening configured to receive a threaded fastener, which is used to reduce the diameter of the fork band 20 to secure the fork band 20 to a fork leg. However, other suitable arrangements for fixing the fork band 20 to the fork leg can also be employed.

A forward-facing portion of the fork band 20 includes an engagement portion 42, which is configured to engage the hook 32 of the trigger 26 (FIGS. 6A-B). The illustrated engagement portion 42 includes an upwardly-facing hook 44. The fork band 20 includes a front wall portion 45 with a forward-facing surface 46 bounded at each side by projections 48. The surface 46 is spaced rearwardly from the hook 44 to provide a space to accommodate the hook 32 of the trigger 26. A radial distance of the hook 44 from a center point of the opening of the fork band 20 can be varied to accommodate a spacing of the fork guard 16 from the suspension fork. The projections 48, front wall portion 45 and a lower wall portion 50 provide strength and rigidity to the hook 44, while still permitting access to the hook 44 to ensure easy engagement of the restraint device 10.

In the illustrated arrangement, the hook 44 of the fork band 20 is a male or protruding member and the hook 32 of the trigger 26 is a female or receiving member. However, the arrangement could be reversed. Preferably, each hook 32, 44 includes interference surfaces that contact one another to inhibit relative movement in the direction of the arrow A in FIG. 7, or perpendicular to the axis of the fork leg. Thus, inadvertent disengagement of the restraint device 10 is inhibited or prevented, thereby improving the reliability of the device 10.

Figure 8:
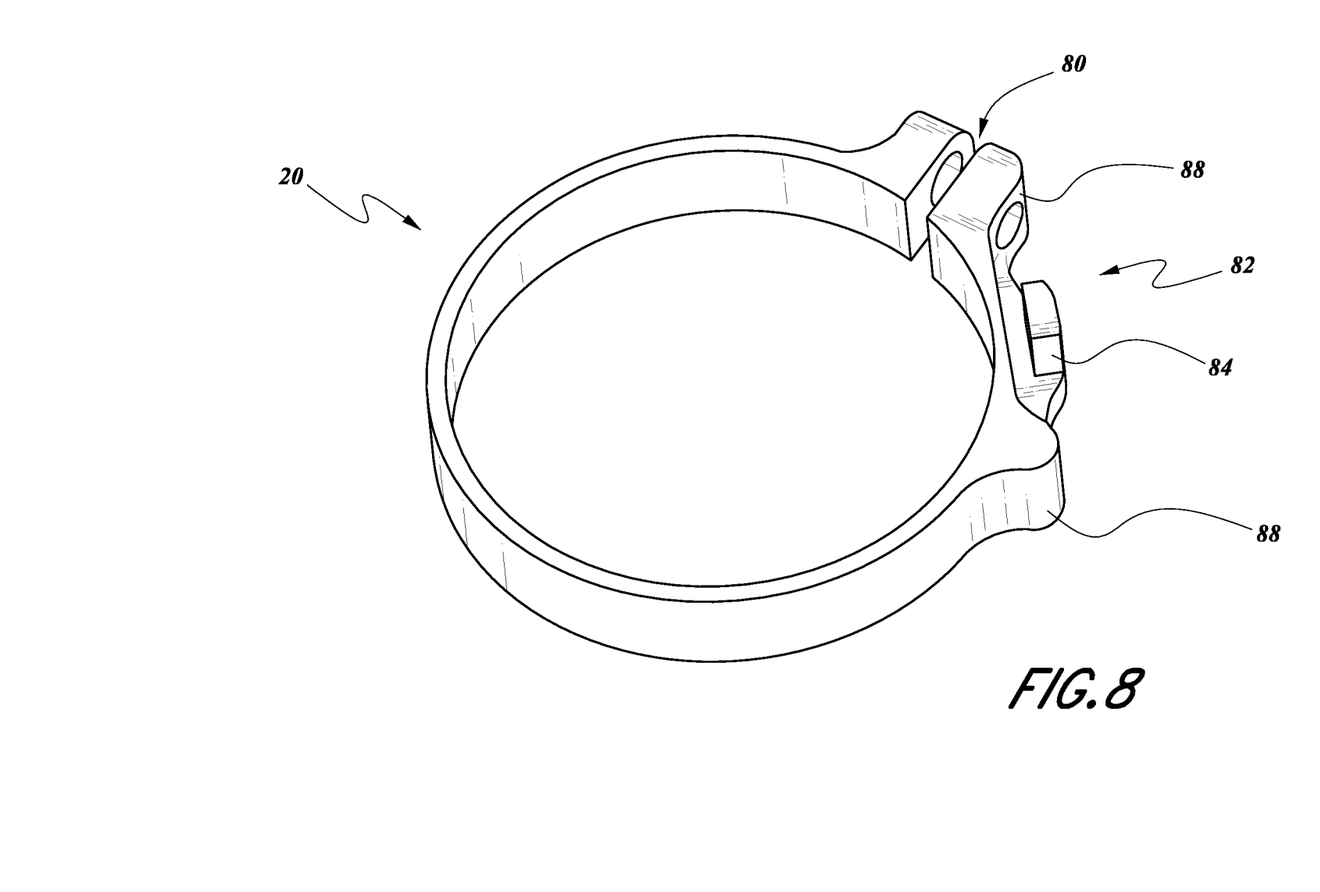
FIG. 8 is a perspective view of another embodiment of the first portion of the restraint device removed from the suspension system.

With reference to FIG. 8, another embodiment of the fork band 20 is illustrated. Preferably, the fork band 20 of FIG. 8 is substantially similar to the fork band of FIGS. 1-7 in both structure and function. Accordingly, only the differences are discussed in detail. Preferably, the fork band 20 comprises a split ring having projections 88 and an assembly slot 80 which may be configured to receive a threaded fastener, which is used to reduce the diameter of the fork band 20 to secure the fork band 20 to a fork leg. The assembly slot 80 may be integrated into one of the projections 88 near a frontward portion of the fork band 20. In the illustrated arrangement, one of the projections 88 is larger in a circumferential direction than the other projection 88. The larger projection 88 includes the assembly slot 80. Between the projections 88 is an engagement portion 82, which is configured to engage the hook 32 of the trigger 26 (FIGS. 6A-B). The illustrated engagement portion 42 includes an upwardly-facing hook 84. Preferably, a fastener opening passes from an outer end of the projection 88 toward the hook 84. In the illustrated arrangement, the fastener opening passes completely through the projection 88. However, in another arrangement, the fastener opening is blind. That is, preferably, the fastener opening does not pass through the end of the projection 88 closest to the hook 84. The fastener opening can be threaded to accept a threaded fastener, which can be used to reduce the size of the assembly slot 80 and the diameter of the fork band 20 to secure the fork band 20 to the suspension fork.

In operation, the suspension fork 11 is compressed until the fork band 20 is positioned below the lever portion 22. The trigger 26 is moved to the advanced position (FIG. 6A) and held while the suspension fork 11 is allowed to rebound, or move toward an extended position. The exposed hook 32 of the trigger 26 engages the hook 44 or 84 of the fork band 20. The shapes of the hooks 32, 44 (84) facilitate engagement therebetween. In some embodiments, the surfaces of hooks 32, 44 (84) opposite of the interference surfaces may be chamfered. Such chamfering would allow the surfaces of the hooks 32, 44 (84) to glide over each other as the fork leg of the suspension fork 11 is being compressed to set the restraint device 10 even if the trigger 26 is lifted before the engagement portion 42 of the fork band 20 has been positioned below the lever portion 22, allowing the hook 44 (84) of the fork band 20 to engage the hook 32 of the trigger 26 as the suspension fork 11 is allowed to rebound. The suspension spring of the suspension fork 11 exerts a force tending to extend the suspension fork 11; however, the engagement of the fork band 20 and the lever portion 22 prevents further extension to hold the suspension fork in a partially compressed position. The interference surfaces of the hooks 32, 44 (84) inhibit or prevent relative movement in the direction of the arrow A to inhibit or prevent undesired disengagement of the restraint device 10. When the suspension fork is further compressed, the hooks 32, 44 (84) become disengaged and the magnetic force generated by magnetic members 36 and 38 move the trigger 26 to the retracted position, thereby moving the restraint device 10 to a disengaged position and permitting continued normal operation of the suspension fork 11.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present restraint device has been described in the context of particularly preferred embodiments, the skilled artisan will appreciate, in view of the present disclosure, that certain advantages, features and aspects of the device may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A suspension restraint device for a telescopic suspension for a vehicle, the suspension having an outer tube and an inner tube configured to be movable relative to one another, the suspension restraint device comprising:

a first portion configured to be secured to a first location on the suspension, the first portion comprising:

an engagement portion; and a second portion configured to be secured to a second location on the suspension, the second portion comprising:
a body,
a lever-actuated restraining hook configured to selectively engage the engagement portion of the first portion to secure the suspension in a partially compressed position, and
at least one magnetic member configured to retract the restraining hook.

2. The device of claim 1, wherein the lever-actuated restraining hook comprises a trigger.

3. The device of claim 2, wherein the trigger comprises a curved surface configured to accommodate the setting of the device by a gloved hand.

4. The device of claim 2, wherein the at least one magnetic member comprises:
a first magnetic member coupled to the body of the second portion;
a second magnetic member coupled to the trigger; and
wherein the first and second magnetic members are configured to create a magnetic force tending to retract the restraining hook into the body.

5. The device of claim 1, wherein the engagement portion of the first portion comprises a second restraining hook configured to engage the lever-actuated restraining hook.

6. The device of claim 5, the second restraining hook comprising:
an interference surface configured to engage the lever-actuated restraining hook, and
a chamfered surface; and
wherein the lever-actuated restraining hook comprises:
an interference surface configured to engage the second restraining hook, and
a chamfered surface, thereby allowing the chamfered surface of the lever-actuated restraining hook to glide over the chamfered surface of the second hook as the restraint device is being set.

7. The device of claim 1, wherein the first portion is a band configured to surround the outer tube of the suspension.

8. The device of claim 7, wherein the band comprises a first projection and a second projection, wherein the engagement portion is located between the first projection and the second projection.

9. The device of claim 8, wherein the band comprises a slot configured to allow the band to be clamped to the outer tube.

10. The device of claim 9, wherein the slot is located in one of the first projection and the second projection.

* * * * *